US007429020B2

(12) United States Patent (10) Patent No.: US 7,429,020 B2
Huebner et al. (45) Date of Patent: Sep. 30, 2008

(54) PIPE HANGER WITH INTEGRAL CABLE TIE CHANNEL

(75) Inventors: Matt M. Huebner, Ravenna, OH (US); Ronald Rich, Burton, OH (US)

(73) Assignee: Waxman Consumer Products Group Inc., Bedford Hts., OH (US)

( * ) Notice: Subject to any disclaimer, the term of this patent is extended or adjusted under 35 U.S.C. 154(b) by 59 days.

(21) Appl. No.: 11/367,899

(22) Filed: Mar. 3, 2006

(65) Prior Publication Data

US 2007/0205335 A1 Sep. 6, 2007

(51) Int. Cl.
*F16L 3/00* (2006.01)
*E21F 17/02* (2006.01)
(52) U.S. Cl. .................... 248/58; 248/74.2; 248/74.3; 24/16 PB
(58) Field of Classification Search .................. 248/58, 248/49, 60, 62, 63, 68.1, 74.2, 74.3, 316.7, 248/339, 304, 305, 306; 24/16 PB, 17 AP
See application file for complete search history.

(56) References Cited

U.S. PATENT DOCUMENTS

| | | | | |
|---|---|---|---|---|
| 2,319,832 A * | 5/1943 | Trochim | ................... | 248/60 |
| 3,218,012 A * | 11/1965 | Volpe | ................... | 248/62 |
| 3,355,132 A * | 11/1967 | Jenkins | ................... | 248/59 |
| 3,556,447 A * | 1/1971 | Jenkins et al. | ................... | 248/62 |
| 3,713,076 A * | 1/1973 | Gabrielian et al. | ................... | 439/352 |
| 3,794,960 A * | 2/1974 | Sugar | ................... | 439/459 |
| 3,923,277 A * | 12/1975 | Perrault et al. | ................... | 248/49 |
| 4,254,930 A * | 3/1981 | Warren | ................... | 248/542 |
| 4,338,707 A * | 7/1982 | Byerly | ................... | 24/542 |
| 4,407,478 A | 10/1983 | Hodges | ................... | 248/542 |
| 4,645,492 A * | 2/1987 | Weeks | ................... | 604/174 |
| 4,768,741 A | 9/1988 | Logsdon | ................... | 248/62 |
| 4,903,921 A | 2/1990 | Logsdon | ................... | 248/74.5 |
| 5,005,789 A * | 4/1991 | Jones | ................... | 248/58 |
| 5,326,151 A * | 7/1994 | Smith et al. | ................... | 297/219.1 |
| 5,385,320 A | 1/1995 | Ismert et al. | ................... | 248/62 |
| 5,542,631 A | 8/1996 | Bruno | ................... | 248/58 |
| 5,740,994 A * | 4/1998 | Laughlin | ................... | 248/68.1 |
| 5,746,401 A | 5/1998 | Condon | ................... | 248/62 |
| 5,876,000 A | 3/1999 | Ismert | | |
| 5,890,683 A * | 4/1999 | DePietro | ................... | 248/58 |
| 5,961,081 A * | 10/1999 | Rinderer | ................... | 248/68.1 |
| 6,126,122 A | 10/2000 | Ismert | ................... | 248/74.1 |
| 6,164,604 A | 12/2000 | Cirino et al. | ................... | 248/74.3 |
| 6,325,338 B1 * | 12/2001 | Del Re et al. | ................... | 248/69 |
| 6,402,096 B1 | 6/2002 | Ismert et al. | | |
| 6,446,915 B1 | 9/2002 | Ismert | | |
| 6,629,676 B1 * | 10/2003 | Gretz | ................... | 248/58 |
| 2007/0101551 A1 * | 5/2007 | Thompson | ................... | 24/16 PB |

* cited by examiner

*Primary Examiner*—Kimberly Wood
(74) *Attorney, Agent, or Firm*—Tarolli, Sundheim, Covell & Tummino LLP

(57) ABSTRACT

The present invention concerns a hook shaped pipe hanger adapted to be affixed to a support structure and support a pipe. The pipe hanger includes a longitudinally extending stem including a plurality of openings to facilitate fastening the stem to the support structure and a hook portion extending from the stem and including an arcuate support surface for supporting an outer periphery of a portion of the pipe. The pipe hanger further includes a cable tie channel proximate to and extending along at least a portion of the arcuate support surface, the channel providing a passageway for a flexible tie support used to secure a pipe to the pipe hanger.

21 Claims, 4 Drawing Sheets

PIPE HANGER WITH INTEGRAL CABLE TIE CHANNEL

FIELD OF THE INVENTION

The present invention relates to a pipe hanger for suspending plastic or metal pipes from a support structure and, more particularly, to a hook shaped pipe hanger with an integral cable tie channel adapted to receive a cable tie to secure a pipe in a hook portion of the pipe hanger.

BACKGROUND OF THE INVENTION

Pipe hangers for suspending plastic or metal pipes substantially horizontally from support structure such as a wall or an underfloor joist are well known. Such hangers are used for a variety of piping applications in residential and commercial buildings and plants including supply lines, such as water and natural gas supply lines, drain and sewer lines, conduit, etc. Two types of pipe hangers are in common use: strap type pipe hangers and hook type pipe hangers. Strap type pipe hangers typically include a stem with a plurality of openings for attachment of the pipe hanger to a joist using nails, screws or other fasteners and a strap extending from the stem and having a ratchet structure for holding a pipe. Patents disclosing strap type pipe hangers include U.S. Pat. No. 4,768,741 to Logsdon and U.S. Pat. No. 5,746,401 to Condon.

Hook shaped pipe hangers typically include a stem with a plurality of openings for attachment of the pipe hanger to a joist and a rigid hook portion for supporting or cradling a pipe. Patents disclosing hook type pipe hangers include U.S. Pat. No. 4,407,478 to Hodges, U.S. Pat. No. 5,542,631 to Bruno and U.S. Pat. No. 5,385,320 to Ismert et al. Since the size of the hook of hook shaped pipe hangers is fixed, such hangers require offering a variety of pipe hangers with different size hook portions to accommodate different size pipe outer diameters. However, hook type pipe hangers facilitate installation of pipe by one person because the hook supports a pipe section while pipe sections are being coupled together. By comparison, strap type pipe hangers require two hands for installation as the pipe section must be supported while the strap is being tightened. Moreover, strap type pipe hangers provide a less appealing visual appearance.

One deficiency of hook type pipe hangers is that the pipe is only supported along a lower half or peripheral circumference of the pipe and the upper half of the pipe is unsecured. Thus, the pipe is susceptible to being raised or lifted out of the hook portion and thereby dislodged from the pipe hanger. This is especially problematic if the pipe hanger is not mounted vertically upright but rather at some other angle. For example, if because of spacing considerations, it was desired to hang the pipe hanger upside down, a simple hook type pipe hanger could not be used because the pipe would not be supported by the pipe hanger. Additionally, even if the hook type pipe hanger is mounted in an upright position, since an upper half of the pipe is unsecured, the pipe is prone to vibrate as pressure fluctuations occur in liquid or gas passing through the pipe, for example, vibration may occur in water supply pipes when a valve is turned on or off or from a water hammer effect.

Attempts have been made to provide additional securement of the pipe within the hook portion and additionally allow the pipe hanger to be used in an inverted position, if desired. Both the '478 patent to Hodges and the '320 patent to Ismert et al. contemplate a protrusion or tooth extending from the stem which provides a snap-fit engagement with the pipe. This approach, however, only secures a portion of the upper half of the pipe. Under conditions of strong vibration of the pipe or if the pipe hanger is used in an inverted position, there is a likelihood of the pipe snapping over the tooth and becoming dislodged from the hanger.

The '320 patent to Ismert et al. also discloses a cable or strap tie which is threaded through slots in the stem and the tip of the hook portion to provide additional securement of the upper half of the pipe. However, threading the cable tie through the narrow slots would be time consuming and difficult especially in situations where the pipe hanger is in a position that is difficult to access or poorly lit. Moreover, the cable tie could not be preinstalled prior to insertion of the pipe because the nonconnector side of strap tie would be pushed downwardly under the pipe. Additionally, when tightening the cable tie, the longitudinal force of the cable tie is directed to the hook tip and the stem adjacent the slots and only a smaller tangent force is applied against the pipe outer surface. Thus, the force applied by the cable tie upon tightening is directed to deflecting (and potentially breaking) the hook tip while only incidentally applying a radially inward and downward force on an outer periphery of the upper half of the pipe.

What is needed is a hook shaped pipe hanger that includes structure to secure an upper half of a pipe against the hook portion by applying a radially inward and downward force on an outer periphery of the upper half of the pipe and which is pre-installed or integral to pipe hanger. What is also needed is a hook shaped pipe hanger that is easy to install and easy to secure the pipe within the hook portion. What is also needed is a hook shaped pipe hanger that is cost efficient to manufacture.

SUMMARY OF THE INVENTION

The present invention concerns a hook shaped pipe hanger adapted to be affixed to a support structure and support a pipe. The hook shaped pipe hanger includes: a longitudinally extending stem including a plurality of openings to facilitate fastening the stem to the support structure; a hook portion extending from the stem and including an arcuate support surface for supporting an outer periphery of a portion of the pipe and a cable or strap tie channel proximate to and extending along at least a portion of the arcuate support surface, the channel providing a passageway for a flexible strap or tie support.

In one embodiment, the hook portion is substantially H-shaped in cross section with inner and outer flanges connected by a central web. The cable tie channel is comprised of a space or a gap defined by a web facing surface of the first flange, the web, a rib extending from the web and spaced from the first flange, and a plurality to tabs bridging distal edges of the first flange and the spaced apart rib.

In another aspect, the present invention concerns a hook shaped pipe hanger adapted to be affixed to a support structure and support a pipe including: a longitudinally extending stem including a plurality of openings to facilitate fastening the stem to the support structure; a hook portion extending from the stem and including an arcuate support surface for supporting an outer periphery of a lower portion of the pipe and a cable tie channel proximate to and extending along at least a portion of the arcuate support surface, and a flexible cable tie routed through and extend from opposite ends of the channel, the cable tie including a ratcheting lock mechanism including ratchet teeth along one end of the cable tie and a locking pawl at an opposite end of the cable tie such that the cable tie is adapted to be drawn tight and lock around an upper portion of the pipe.

These and other objects, advantages, and features of the exemplary embodiment of the invention are described in detail in conjunction with the accompanying drawings.

DETAILED DESCRIPTION

Figure 1:
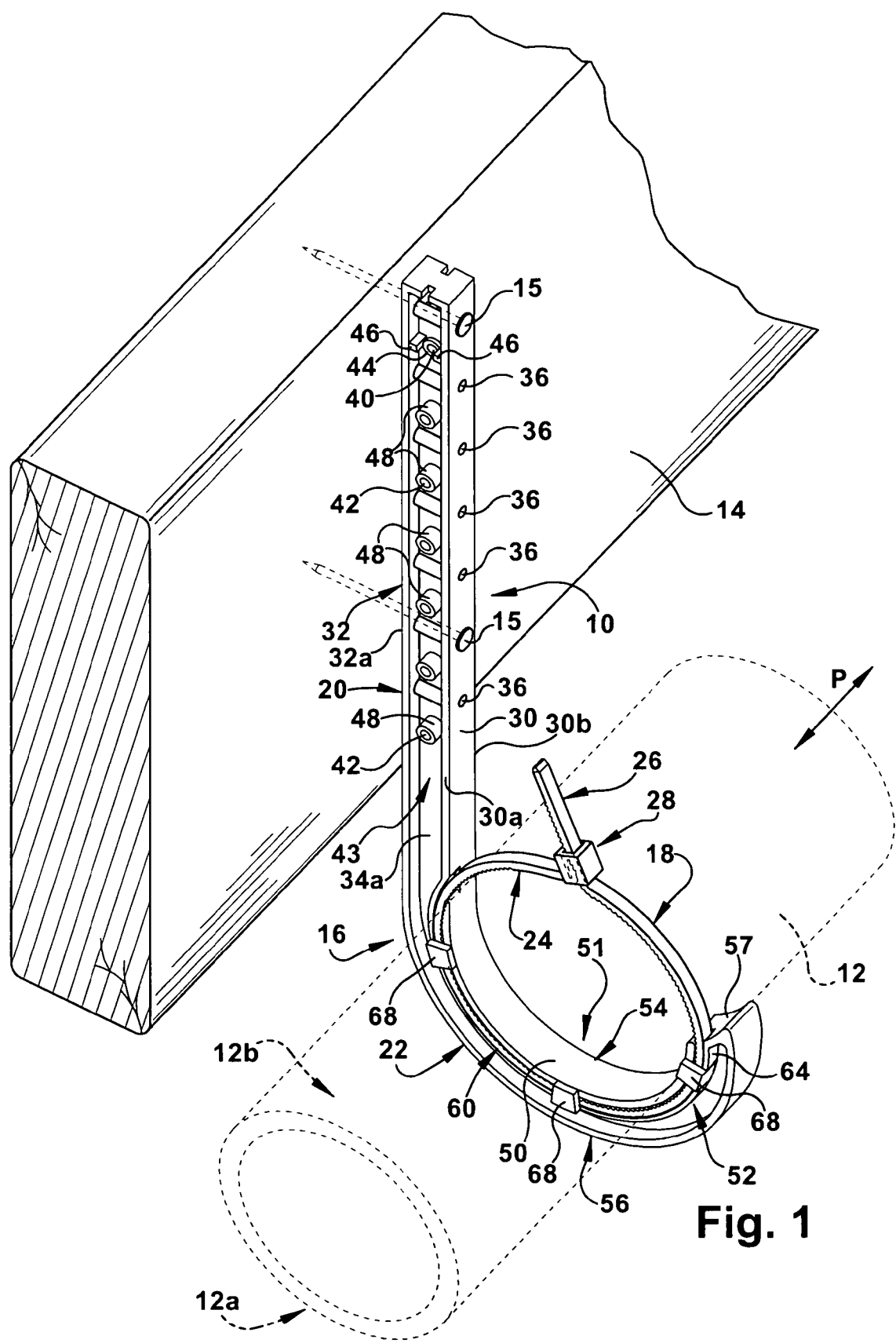
FIG. 1 is a perspective view of a hook shaped pipe hanger of the present invention supporting a pipe and affixed to a support surface.

Turning to the drawings, FIGS. 1-4 depict a hook shaped pipe hanger 10 constructed in accordance with one exemplary embodiment of the present invention. As is shown in FIG. 1, the pipe hanger 10 is intended to secure a pipe 12 with respect to a support structure such, as an underfloor joist 14. The pipe hanger 10 is comprised of a body portion 16 and a cable tie 18. The body portion 16 includes a stem 20 adapted to be attached to the joist 14 and an integral hook portion 22 extending from stem 20 and adapted to support a lower outer peripheral surface 12a of the pipe 12. The body portion 16 is preferably fabricated of a lightweight, strong, and impact resistant polymer material such as ABS (acrylonitrile butadiene styrene) thermoplastic. Other lightweight, high strength polymers known to those of skill in the art including various thermoplastics including PVC (polyvinyl chloride) and various thermosetting plastics including Bakelite and glass reinforced plastics would also be suitable. The body portion 16 may be efficiently molded as a one piece member. Alternately, metal could be used to fabricate the body portion 16.

The cable tie 18 (best seen in FIG. 7), sometimes referred to as a tie wrap, a strap tie, a lashing tie or a zip tie, is a flexible thin elongated member whose end portions 24, 26 comprise a ratcheting lock mechanism 28. The ratcheting lock mechanism 28 allows the cable tie 18 to be tightened and locked around an upper peripheral surface 12b of the pipe 12 creating a downward and radially inwardly directed force on the pipe and thereby securing the pipe 12 to the hook portion 22 of the pipe hanger 10. The cable tie 18 effectively secures the pipe 12 to the pipe hanger 10 and allows the pipe hanger 10 be used in any orientation including being mounted upside down.

Figure 8:
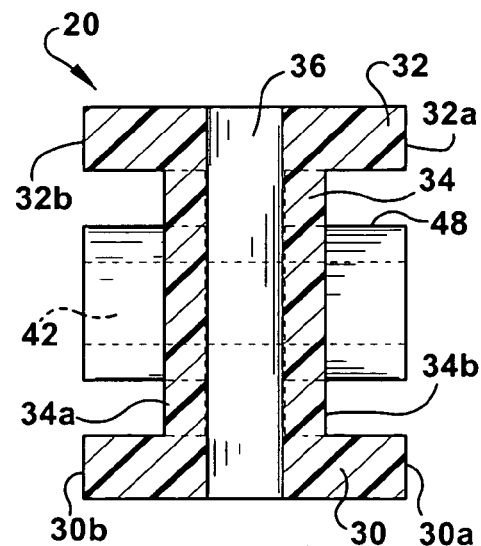
FIG. 8 is a sectional view of the pipe hanger of FIG. 1 as seen from a plane indicated by the line 8-8 in FIG. 3.

As can best be seen in FIG. 8, the elongated stem 20, when viewed in cross section, is preferably H-shaped, which minimizes material usage and provides necessary strength for holding the pipe 12 and resistance to twisting or bending forces. The stem 20 comprises first and second flanges 30, 32 spaced apart by a web 34. The first flange 30 will be referred to as the inner flange as it is closer to the pipe 12 than the second or outer flange 32.

Figure 6:
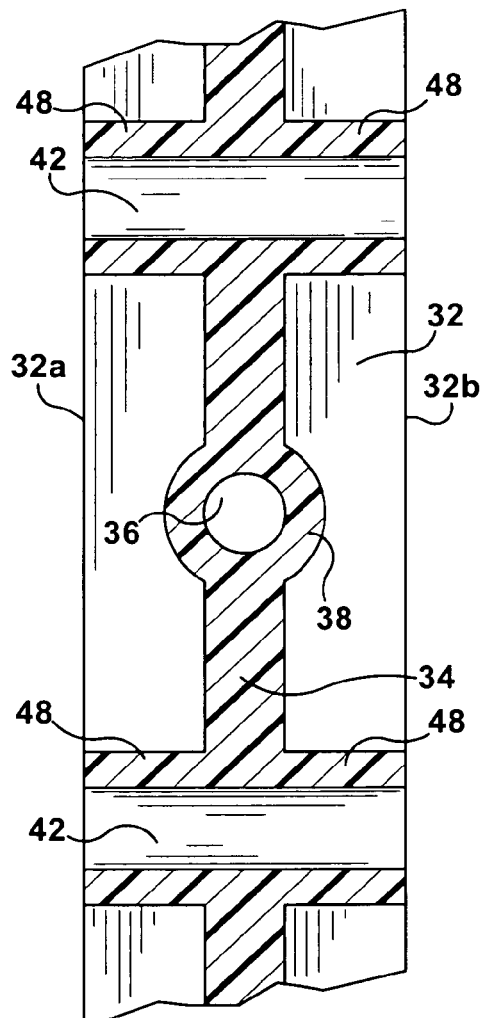
FIG. 6 is a sectional view of the pipe hanger of FIG. 1 as seen from a plane indicated by the line 6-6 in FIG. 3.

A plurality of openings 36 extend through the flanges 30, 32 and reinforced sections 38 of the web 34, as best seen in FIG. 6. The openings 36 are sized to accept fasteners, such as nails 15, which may be used to secure the pipe hanger 10 to the joist 14. The plurality of openings 36, which are perpendicular to a longitudinal extent or direction P of the pipe 12, allow the pipe hanger 10 to be mounted perpendicularly to the joist 14 and support a pipe extending parallel to the joist. The plurality of openings 36 are provided to permit the pipe hanger to be mounted at any desired height or angle with respect to the joist 14. The reinforced sections 38 of the web 34 provide additional strength and insure that the fasteners hidden from view.

An upper or top opening 40 and a plurality of lower openings 42 (FIG. 3) are provided to permit the pipe hanger 10 to be mounted parallel to the joist 14 and support a pipe extending perpendicularly to the joist. The top opening 40 is defined by cylindrical supports 44 extending perpendicularly from the web faces 34a, 34b and a flanking pair of spacing shoulders 46 extending flush with the edges 30a, 30b, 32a, 32b of the respective web flanges 30, 32. The lower openings 42 are defined by cylindrical supports 48 extending perpendicularly from the web faces 34a, 34b and extending flush with the edges 30a, 30b, 32a, 32b of the web flanges 30, 32. The spacing shoulders 46 and the cylindrical supports 48 prevent the flanges 30, 32 from being damaged by a hammer when nails are being driven through the openings 40, 42.

Extending downwardly from the stem 20 is the hook portion 22. Preferably, the hook portion 22 is integral with the stem 20 and includes an arcuate support surface 50 that defines a pipe cradle 51 and contacts the lower outer surface 12a of the pipe 12. A radius of curvature of the support surface 50 is fabricated to conform to an outer diameter of the size pipe the hanger 10 is designed to support so as to receive the pipe in a close, cradling fit (FIG. 1).

Figure 3:
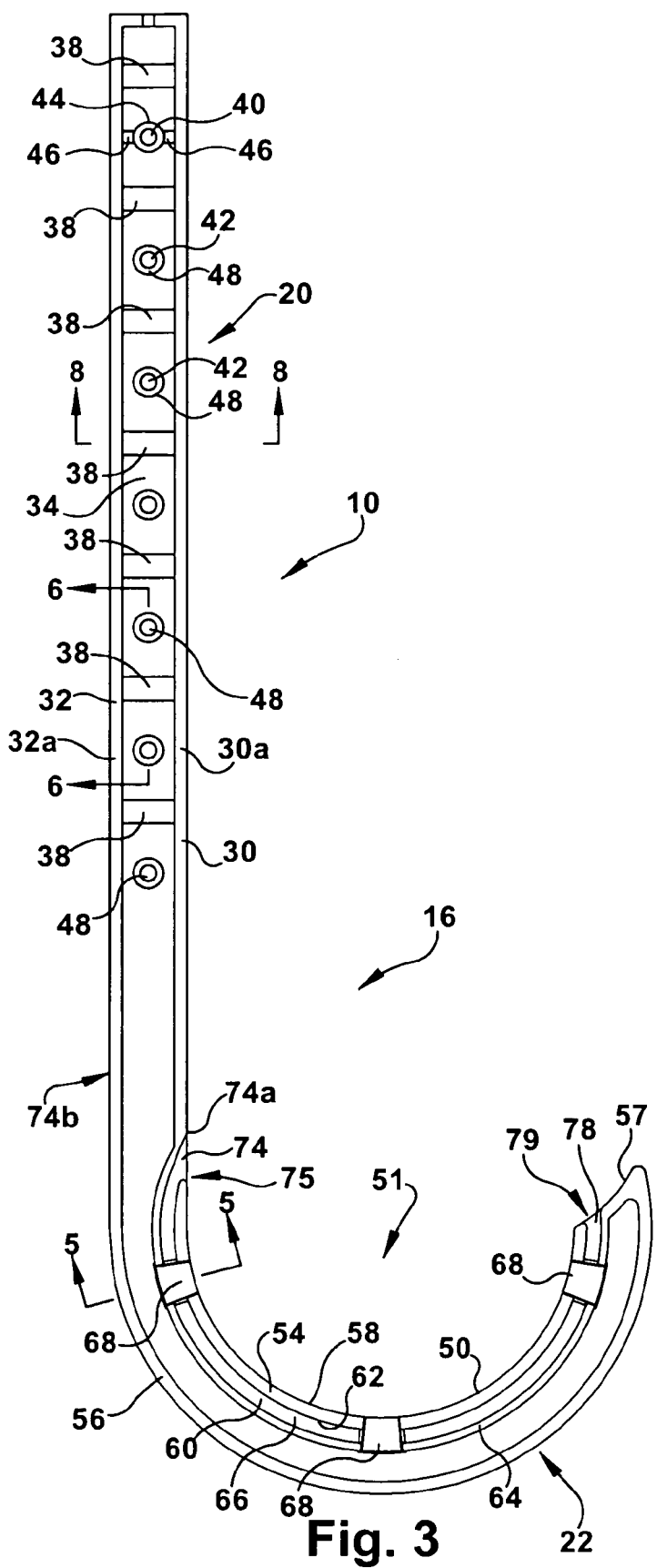
FIG. 3 is a side elevation view of the pipe hanger of FIG. 1.
Figure 4:
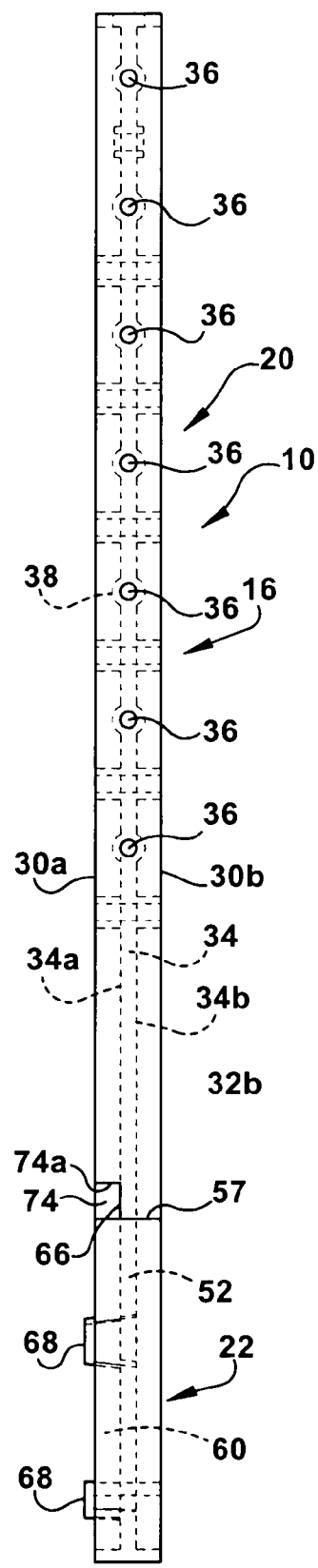
FIG. 4 is a front elevation view of the pipe hanger of FIG. 1.
Figure 5:
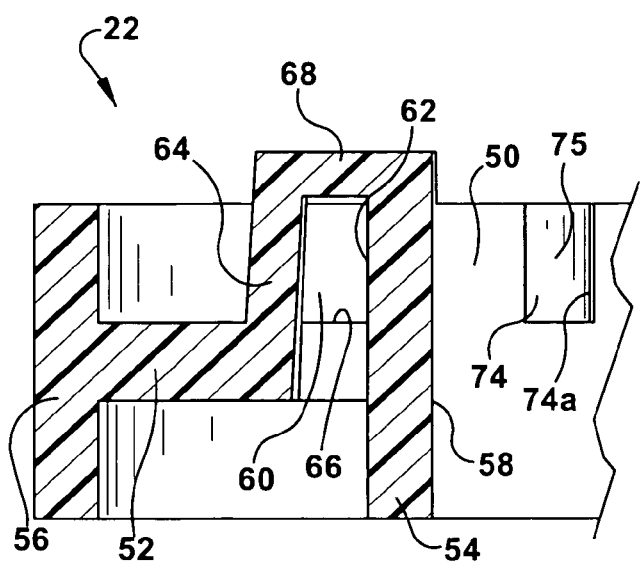
FIG. 5 is a sectional view of the pipe hanger of FIG. 1 as seen from a plane indicated by the line 5-5 in FIG. 3.

Like the stem 20, the hook portion 22 is H-shaped in cross section, with a web 52 extending between first and second flanges 54, 56. The hook portion 22 includes an arcuate or upwardly tapered distal end 57, extending between the first and second flanges 54, 56, that guides the pipe 12 into a pipe cradle 51 of the hook portion. The support surface 50 is defined by a pipe facing surface 58 of the first flange 54. As best seen in FIGS. 3 and 5, the hook portion 22 defines a channel 60 through which the cable tie 18 extends. The channel 60 is proximate to and extends along the pipe support surface 50 and is defined by a web facing surface 62 of the first flange 54, an arcuate rib 64 extending longitudinally from the web 52 and a face 66 of the web 52. The rib 64 extends parallel to the web facing surface 62 of the first flange 54 providing a substantially constant width for the channel 60. The channel 60 is partially open and partially enclosed by three tabs 68 that extend between an edge 70 of the first flange 54 and an edge 72 of the rib 64.

Figure 2:
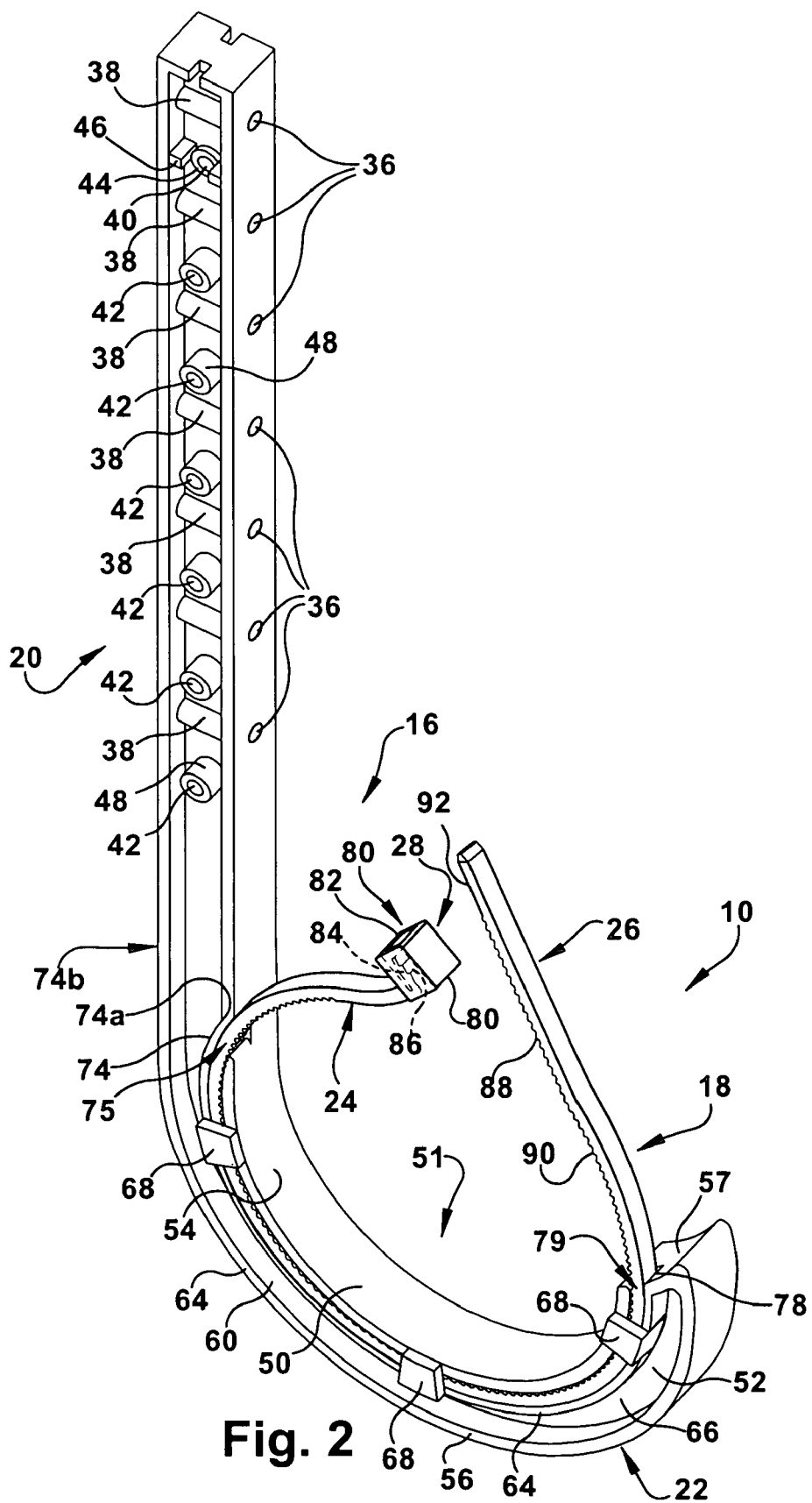
FIG. 2 is a perspective view of the hook shaped pipe hanger of FIG. 1.

As is seen in FIGS. 2, 3 and 5, a slotted opening 74 in the first flange 54 is offset from the web 52 and defines an opening 75 at one end of the channel 60. As can be seen, one end 76 of the rib 64 extends from an upper end 74a of the slotted opening 74 of the first flange 54 near a junction 74b between the first flange 54 and the first flange 30 of the stem portion 20. The rib 64 extends parallel to the web facing surface 62 of the first flange 54 and perpendicular to the web 52 thereby providing the channel 60 with a substantially constant width and depth over its extent. A slotted opening 78 in the tapered distal end 57 of the hook portion 22 is offset from the web 52 and defines an opening 79 at an opposite end of the channel 60.

Figure 7:
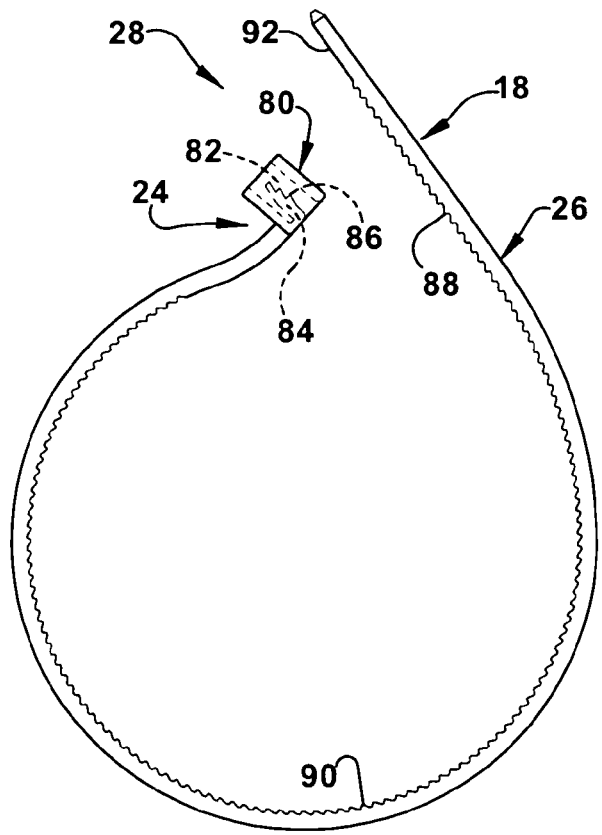
FIG. 7 is a front elevation view of a cable tie of the pipe hanger of FIG. 1.

The cable tie 18, preferably, is a lock type strap for tightening around and thereby securing the pipe 12 to the hook portion 22. The cable tie 18 extends through the channel 60 and includes the cable tie end portions 24, 26 extending sufficiently beyond the channel openings 74, 78 such that the portions 24, 26 can be locked together (FIG. 2). As is best seen in FIG. 7, the first end portion 24 includes a ratchet-type locking pawl 80 with a slotted opening 82 sized to receive the second end portion 26. Within the opening 82 of the pawl 80 is a lever 84 that includes engagement teeth 86 on one surface. The second end portion 26 includes mating teeth 88 on a pipe facing side 90 of the cable tie 18. A short section 92 of the cable tie adjacent a distal end of the second end portion 26 may not include teeth to facilitate threading the second end portion 26 through the slotted opening 82. The teeth 88 may extend beyond the second end portion 26 extending toward the first end portion 24. When the second end portion 26 is threaded and pulled through the slot opening 82, the pipe 12 is encircled and the engagement teeth 86 of the pawl lever 84 engage the teeth 88 of the second end portion 26 to prevent retraction of the second end portion 26 from the first end portion 24.

Thus, as is conventional with one-way locking cable ties, as a greater and greater length of the second end portion 26 of the cable tie 18 is drawn through the pawl 80 of the first end portion 24 a diameter of the cable tie 18 is reduced and the cable tie becomes tighter and tighter around the upper outer surface 12b of pipe 12. The tighter the cable tie 18 is wrapped around the upper outer pipe surface 12b, the more downward and radially inward force is exerted by the cable tie on the upper outer pipe surface 12b and the more securely the pipe 12 is held within the pipe cradle 51.

The one-way locking action of the toothed lever 84 of the pawl 80 and the engaging teeth 88 of the second end portion 26 prevents the second end portion 26 from loosening or releasing with respect to the first end portion 24. Further, threading and drawing of the second end portion 26 through the locking pawl 80 to tighten the cable tie 18 is facilitated by the slotted opening 82 of the pawl being oriented perpendicularly to the general extent of the first end portion 24. If release of the pipe 12 is desired, the toothed lever 84 of the pawl 80 is pressed on appropriately to sufficiently disengage the teeth 88 of the second end portion 26 from the level 84 and allow the second end portion 24 to be pulled outwardly from the pawl 80.

Advantageously, the locking action of the cable tie 18 permits the pipe hanger 10 to securely hold a pipe regardless of pipe hanger orientation, e.g., the pipe hanger may be mounted upside down and the pipe 12 will still be held. Upside down use, of course, would not be recommended for long term use and would be suitable only for very light weight pipes because of the possibility of the cable tie failing over time due to fatigue from the weight of the pipe.

Advantageously, the channel 60 is smooth and allows the cable tie 18 to be easily moved within the channel to facilitate insertion of the pipe 12. That is, when the pipe 12 is being inserted, the first end portion 24 may be pulled upwardly to reduce or eliminate a length of the second end portion 26 extending from the channel opening 78. In this way, the second end portion 26 is not subject to being bent or caught under the pipe 12 when the pipe is placed into the cradle 51. Once the pipe 12 is positioned in the cradle 51, the first end portion 24 may be pushed downwardly to increase the length of the second end portion 26 extending from the opening 78 to facilitate threading the second end portion though the slotted opening 82 of the locking pawl 80.

The structure of the pipe hanger 10 advantageously allows mounting of the pipe hanger 10 to a wall or support joist 14, installation of the pipe 12 into the cradle 51 and mating of the cable tie ends 24, 26 and tightening of the cable tie 18 by one person. Advantageously, the pipe hanger 10 could be sold with the cable tie 18 already installed through the channel 60 or, alternatively, since the cable tie 18 is readily threaded through channel 60 by a user, the user could insert a cable tie, in whatever length of cable tie desired, just before using. This would provide differing length and thickness of straps being used depending on the application. The present invention contemplates all such possibilities.

It is appreciated that while a preferred embodiment of the invention has been described, it is the intent that the invention include all modifications and alterations from the disclosed design falling within the spirit or scope of the appended claims.

We claim:

1. A pipe hanger comprising:
   a) a longitudinally extending stem including a plurality of openings to facilitate fastening the stem to a support structure;
   b) a hook portion extending from the stem and including an arcuate support surface for supporting an outer periphery of a portion of a pipe, the hook portion including a first flange, a web extending radially outwardly from the first flange along an extent of the first flange and a rib extending transversely from the web, a pipe facing surface of the first flange comprising the arcuate support surface, the rib being spaced from and substantially parallel to a web facing surface of the first flange; and
   c) a cable tie channel proximate to and extending along at least a portion of the arcuate support surface, the channel providing a passageway for a flexible cable tie used to secure a pipe to the pipe hanger, the cable tie channel defined by the web facing surface of the first flange, a portion of the web extending between the rib and the first flange, and the rib.

2. The pipe hanger of claim 1 wherein the hook portion is substantially H-shaped in cross section with first and second flanges connected by the web, the second flange being disposed radially outwardly of the rib.

3. The pipe hanger of claim 2 wherein the cable tie channel is substantially constant in depth between the web facing surface of the first flange and the rib.

4. The pipe hanger of claim 3 wherein the cable tie channel is of substantially constant width.

5. The pipe hanger of claim 3 wherein the channel is additionally defined by a plurality to tabs bridging respective distal edges of the first flange and the spaced apart rib.

6. The pipe hanger of claim 3 wherein the cable tie channel includes a first opening at one end of the channel, the opening comprising a slotted opening in a portion of the first flange offset from the web.

7. The pipe hanger of claim 6 wherein the cable tie channel includes a second opening at a second end of the channel, the opening comprising an opening in a distal end of the hook portion.

8. The pipe hanger of claim 7 wherein the rib extends from the slotted opening in the distal end of the hook portion to the opening in a distal end of the hook portion.

9. The pipe hanger of claim 1 wherein the stem is substantially H-shaped in cross section including a web extending between first and second flanges.

10. A pipe hanger adapted to be affixed to a support structure and support a pipe, the pipe hanger comprising:
    a) a longitudinally extending stem including a plurality of openings to facilitate fastening the stem to the support structure;
    b) a hook portion extending from the stem and including an arcuate support surface for supporting an outer periphery of a lower portion of the pipe and a cable tie channel proximate to and extending along at least a portion of the arcuate support surface, the hook portion including a first flange, a web extending radially outwardly from the first flange along an extent of the first flange and a rib extending transversely from the web, a pipe facing surface of the first flange comprising the arcuate support surface, the rib being spaced from and substantially parallel to a web facing surface of the first flange, the cable tie channel defined by the web facing surface of the first flange, a portion of the web extending between the rib and the first flange, and the rib; and c) a flexible cable tie routed through and extending from opposite ends of the channel, the cable tie including a ratcheting lock mechanism for locking the cable tie around an upper portion of the pipe to secure the pipe to the hook portion.

11. The pipe hanger of claim 10 wherein the ratcheting lock mechanism includes ratchet teeth along one end portion of the cable tie and a ratchet-type locking pawl at an opposite end of the cable tie, the one end portion sized to be inserted through the locking pawl and tightened around the pipe, the locking pawl engaging the ratchet teeth to lock the cable tie.

12. The pipe hanger of claim 10 wherein the hook portion is substantially H-shaped in cross section with first and second flanges connected by the web, the second flange being disposed radially outwardly of the rib.

13. The pipe hanger of claim 12 wherein the cable tie channel is substantially constant in depth between the web facing surface of the first flange and the rib.

14. The pipe hanger of claim 13 wherein the cable tie channel is of substantially constant width.

15. The pipe hanger of claim 13 wherein the channel is additionally defined by a plurality to tabs bridging respective distal edges of the first flange and the spaced apart rib.

16. The pipe hanger of claim 12 wherein the cable tie channel includes a first opening at one end of the channel, the opening comprising a slotted opening in a portion of the first flange offset from the web.

17. The pipe hanger of claim 16 wherein the cable tie channel includes a second opening at a second end of the channel, the opening comprising an opening in a distal end of the hook portion.

18. The pipe hanger of claim 17 wherein the rib extends from the slotted opening in the distal end of the hook portion to the opening in a distal end of the hook portion.

19. The pipe hanger of claim 10 wherein the stem is substantially H-shaped in cross section including a web extending between first and second flanges.

20. A pipe hanger comprising:
a) a longitudinally extending stem including a plurality of openings to facilitate fastening the stem to a support structure;
b) a hook portion extending from the stem and including an arcuate support surface for supporting an outer periphery of a portion of a pipe, the hook portion being substantially H-shaped in cross section with first and second flanges connected by a central web, a pipe facing surface of the first flange comprising the arcuate support surface; and
c) a cable tie channel proximate to and extending along at least a portion of the arcuate support surface, the channel providing a passageway for a flexible cable tie used to secure a pipe to the pipe hanger, the cable tie channel including a first opening at one end of the channel, the opening comprising a slotted opening in a portion of the first flange offset from the web.

21. A pipe hanger adapted to be affixed to a support structure and support a pipe, the pipe hanger comprising:
a) a longitudinally extending stem including a plurality of openings to facilitate fastening the stem to the support structure;
b) a hook portion extending from the stem and including an arcuate support surface for supporting an outer periphery of a lower portion of the pipe and a cable tie channel proximate to and extending along at least a portion of the arcuate support surface, the hook portion being substantially H-shaped in cross section with first and second flanges connected by a central web; and
c) a flexible cable tie routed through and extend from opposite ends of the channel, the cable tie including a ratcheting lock mechanism for locking the cable tie around an upper portion of the pipe to secure the pipe to the hook portion, the cable tie channel including a first opening at one end of the channel, the opening comprising a slotted opening in a portion of the first flange offset from the web.

* * * * *